United States Patent [19]

Iga et al.

[11] 4,238,852
[45] Dec. 9, 1980

[54] ERROR CORRECTING SYSTEM

[75] Inventors: Akira Iga, Kawasaki; Toshitada Doi, Yokohama, both of Japan

[73] Assignee: Sony Corporation, Tokyo, Japan

[21] Appl. No.: 30,652

[22] Filed: Apr. 16, 1979

[30] Foreign Application Priority Data

Apr. 17, 1978 [JP] Japan .................................. 53-44995

[51] Int. Cl.³ ............................................. G06F 11/10
[52] U.S. Cl. ......................................... 371/40; 360/32; 360/53; 371/38
[58] Field of Search ................. 371/40, 38, 2; 360/32, 360/38, 53

[56] References Cited

U.S. PATENT DOCUMENTS

| | | | |
|---|---|---|---|
| 3,582,881 | 6/1971 | Burton ................................... | 371/40 |
| 3,585,586 | 6/1971 | Harmon et al. ......................... | 371/2 |
| 4,145,683 | 3/1979 | Brookhart .............................. | 371/38 |
| 4,146,099 | 3/1979 | Matsushima et al. ................... | 360/32 |
| 4,151,510 | 4/1979 | Howell et al. .......................... | 371/40 |

OTHER PUBLICATIONS

T. Doi et al., A Long-Play Digital Audio Disk System, Journal of Audio Engineering Society, 1979, Dec., vol. 27, No. 12, pp. 875-981.

Primary Examiner—Charles E. Atkinson
Attorney, Agent, or Firm—Lewis H. Eslinger; Alvin Sinderbrand

[57] ABSTRACT

Blocks of digital words containing an error correcting word are time interleaved into time-interleaved blocks of words, each of which contains no more than one word from any one of the original blocks. The time-interleaved blocks of words are converted to a bit-by-bit serial digital data stream which is time-base compressed to permit insertion therein of an error detecting code word and synchronizing signals. The resulting serial data stream may be recorded on a VTR. After reproduction, each time interleaved block is checked for errors and is then time de-interleaved to reconstruct the original blocks of digital words. If one or more errors exist in words in a time-interleaved block, no more than a single word in any one of the time de-interleaved blocks contains an error. Single-word errors in a reconstructed block are corrected using the error correcting word accompanying the reconstructed block.

6 Claims, 26 Drawing Figures

ERROR CORRECTING SYSTEM

BACKGROUND OF THE INVENTION

This invention generally relates to an error-correcting system, and more particularly to a system capable of correcting errors in recorded digital signals, which errors endure for a time long enough to place errors in two or more consecutive digital words, as when the errors are due to noise, bursts and signal dropouts typical of signal recording and playback systems such as video tape recorders (hereinafter referred to as VTR).

There is known a system which transmits digital signals in a group or block consisting of information words and check words. Let is be assumed that N is the number of information words in one group or block such as $S_1, S_2, \ldots S_N$. Then a check word C is derived by performing the bit-by-bit addition $C = S_1 \oplus S_2 \oplus \ldots \oplus S_N$ (where the symbol $\oplus$ means modulo 2 addition). According to this system, if one of the information words, for example, $S_1$ contains an error, every bit of $S_1$ is set to zero, and then the correct word $S_1$ is obtained by the calculation: $S_1 = 0 \oplus S_2 \oplus S_3 \oplus \ldots \oplus S_N \oplus C$. However, in such an error-correcting system, each of the information signals, $S_1, \ldots S_N$, requires an additional check signal to identify an error before error correction can be applied.

U.S. Patent Application Ser. No. 860,883, filed Dec. 15, 1977 and assigned to the assignee of the present application, discloses in detail another error correcting system used in VTRs to record pulse code modulation (PCM) signals representing audio signals.

According to the above patent application, a signal to be processed is converted into digital words. Cyclic redundancy check (CRC) words are added to the information words to detect errors by selective simultaneous comparison of the information words. The collection of simultaneously available CRC and information words are encoded with inclusion of an error-correcting code such as an optimum rectangular code (ORC). A complete set of information bit, CRC and ORC words constitutes an error-correctable block code signal. Groups of block code signals are read out serially, interleaved in a related order and time-compressed to allow synchronizing signals at video line and field rates to be inserted in the serial bit stream at appropriate times in the time-compressed signals so that the synchronizing signals can properly control the VTR.

In playback, the signals are de-interleaved, and the CRC and ORC signals are analyzed in conjunction with the reproduced information signals to detect and correct dropout and burst signals.

A typical burst or dropout error is most likely to produce errors in a plurality of sequentially occurring information words. An error correction code is best able to correct only a single word error in a code block. Thus, a burst or dropout affecting more than one contiguous word is likely to create an error which cannot be corrected.

OBJECTS AND SUMMARY OF THE INVENTION

It is one of the objects of this invention to provide an error-checking and correcting method suitable for checking and correcting errors in serially recorded groups of binary signals which can overcome the problems of the prior art.

It is another object of this invention to provide an error correcting system using parity and CRC techniques in serially recording binary signals for error-free playback thereof.

It is a further object of this invention to provide an improved method and apparatus for correcting burst and dropout errors of recorded digital signals using an error-correcting code.

It is a still further object of this invention to provide an improved and simplified method and system for converting an audio signal into a PCM signal, modifying the PCM signal into a video format, recording the modified PCM signal with error-correcting code signals in a VTR, and playing back and reconstituting the audio signal.

It is a further object of this invention to selectively time delay simultaneous or sequential information to place information words which were originally contiguous into separate time-interlaced groups or blocks spaced apart in time to which separate error detecting and error correcting codes are applied thus time separating information words which may have errors into separate error-correctable blocks or groups.

According to an aspect of the invention, there is provided a method of processing digital information words sequentially transferred which comprises the steps of: forming a block of a plurality of the information words, forming and adding an error-correcting word to the block, the error-correcting word being capable of reproducing any one of the information words in the block, time-interleaving each of the information words and the error-correcting word in the block into time-interleaved blocks distributed over a predetermined time, adding an error-detecting code to at least one of the time-interleaved blocks, and transmitting the time-interleaved block and the error-detecting code associated therewith.

According to a feature of the invention, there is provided apparatus for processing digital information words comprising means for distributing a predetermined number of the digital information words into a block, means for forming and adding a error-correcting word to the block, interleaving means for time-interleaving each information word in the block and the error-correcting word into time-interleaved blocks distributed over a predetermined time, means for adding an error-detecting code to each of the time-interleaved blocks, and means for transmitting the time-interleaved blocks and the error-detecting code.

In accordance with this invention, a signal to be processed, such as an analog audio signal, is repetitively sampled and each sample is converted into a digital word such as a PCM signal. Each digital word may consist of a plurality, suitably about 8, digits or bits which represent the amplitude of the analog signal at the instant of encoding. The 8 bits making up a digital word are either simultaneously or sequentially available. A plurality of words, suitably a predetermined number or words, forms a block. An error-correcting word is appended to the words of the block by performing a bit by bit modulo 2 summation of corresponding bits of all the words. The digital words of a block and their associated error-correcting word as distributed in time and time-interleaved so that each of the plurality of words in a given block is time separated and forms part of separate time-interleaved blocks. The time-interleaving places each word of a block into different time-interleaved blocks. A CRC code word is added to each time-interleaved block to check for whether error exists in the time-interleaved signals during decoding. A complete sequence of time-interleaved blocks contains digital words, error-correcting words, and CRC words, which constitutes an error-correctable time-interleaved block code signal. Groups of time-interleaved block code signals are time-compressed to allow synchronizing signals at video line and field rates to be included at appropriate times in the time-compressed signals so that the synchronizing signals can properly control the VTR and the bits thereof are serially recorded on the video tape.

When the recorded signals are reproduced from the VTR, the time-interleaved blocks are checked for errors using the CRC words recorded with them. If no errors are found, the time-interleaved blocks are time base expanded and de-interleaved into their original blocks. The words in the blocks are sequentially converted from digital to analog to recreate a high fidelity reproduction of the original input audio signal.

If an error is indicated by the CRC word in a reproduced time-interleaved block, all bits of the words in the time-interleaved block are set to zero and the value of the affected words in the de-interleaved blocks are obtained by modulo 2 summation of their corresponding bits with the error correcting word. Since each word in a de-interleaved block was recorded and reproduced in a different time-interleaved block, the effects of a single noise burst or dropout which affected no more than a few consecutive words in the time-interleaved block are spread out as single word errors in separate de-interleaved blocks. Since single errors can be perfectly corrected, such noise burst or dropout errors which affect a few consecutive words in a time-interleaved block are amenable to perfect correction.

The above, and other objects, features and advantages of the present invention will become apparent from the following description read in conjunction with the accompanying drawings.

DETAILED DESCRIPTION OF THE PREFERRED EMBODIMENT

Figures 1A, 1B:
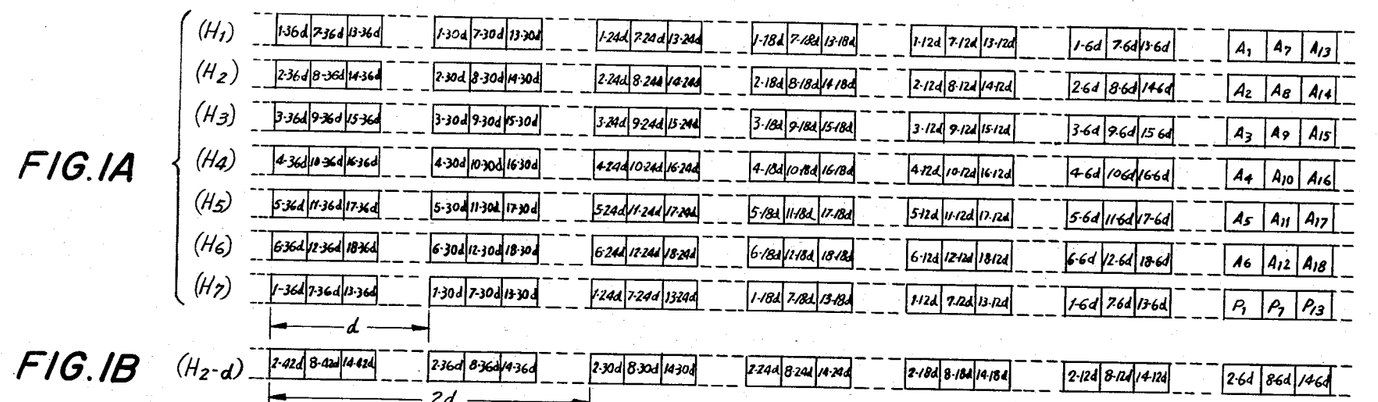
FIGS. 1A–1H are graphs showing the time relationship of signals to which reference will be made in describing time-interleaving of words.

Referring to FIG. 1A, block code formation according to the present invention is shown, in which A designates one word, suitably of 8 bits, of information to be recorded. An analog signal such as an audio signal is sampled and one sample is used to form a digital word representing the amplitude of the analog signal. The order (word number) of the information words is indicated by subscripts such as $A_1$, $A_2$, $A_3$, ..., as shown in the right three columns of words. In FIG. 1A, words which occurred prior to $A_1$ to $A_6$ are expressed by subscripts only. Their time of occurrence is indicated by a subscript d. For example, the word in the upper left box, $1\text{-}36d$, is word $A_1$ which occurred 36 delay times d prior to the present $A_1$. Delay time d may be conveniently taken to equal the time for expressing a word $A_N$. Six successive words $A_1\text{-}A_6$, $A_7\text{-}A_{12}$, $A_{13}\text{-}A_{18}$, etc., are arranged to form columns. In FIG. 1A, the left most group of words $A_{1\text{-}36d}$, $A_{2\text{-}36d}$, $A_{3\text{-}36d}$, $A_{4\text{-}36d}$, $A_{5\text{-}36d}$, $A_{6\text{-}36d}$, represents the first six words originating 36d before the right most group $A_{13}\text{-}A_{18}$. An error-correcting code word P is added to each column of six words. For example, a parity word $P_{1\text{-}36d}$ may be added to the column containing $A_{1}\text{-}A_{36d}$ to $A_{6}\text{-}A_{36d}$. The number of bits forming the parity word equals the number of bits of a data word. The above six words and their corresponding parity word $P_{1\text{-}36d}$ are in the relation such that $A_{1\text{-}36d} \oplus A_{2\text{-}36d} \oplus A_{3\text{-}36d} \oplus A_{4\text{-}36d} \oplus A_{5\text{-}36d} \oplus A_{6\text{-}36d} = P_{1\text{-}36d}$. There is thus obtained a matrix or block of digital data having seven rows and a plurality of columns, that is, six rows of $H_1$ through $H_6$, each consisting of digital words, and one row of $H_7$ consisting of a parity word.

Figure 1C:
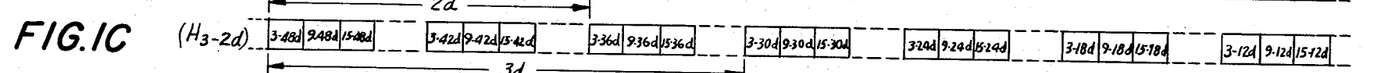
Figure 1D:
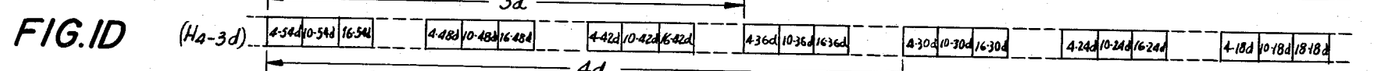
Figure 1E:
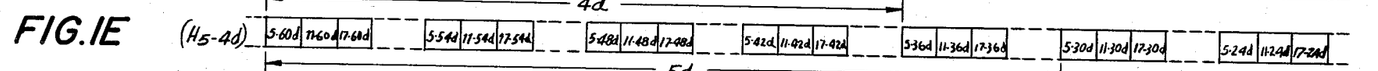
Figures 1F, 1G:
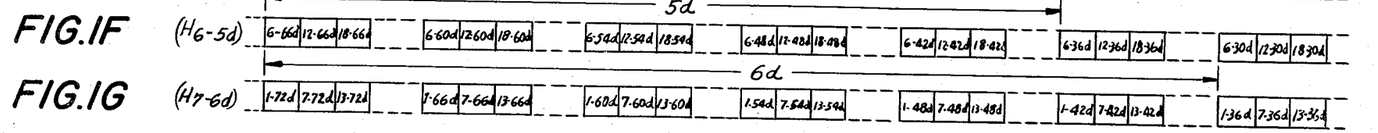
Figure 1H:
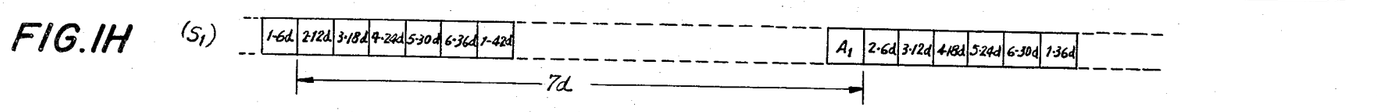

In order to accomplish time-interleaving of words, words in the second row $H_2$ of FIG. 1A are delayed by time delay d (FIG. 1B), equal to a word time, to obtain a word sequence $H_{2\text{-}d}$. Similarly, the word sequence $H_3$ is delayed by 2d (FIG. 1C) to obtain a word sequence $H_{3\text{-}2d}$, the word sequence $H_4$ is delayed by 3d (FIG. 1D) to obtain a word sequence $H_{4\text{-}3d}$, the word sequence $H_5$ is delayed 4d (FIG. 1E) to obtain the word sequence $H_{5\text{-}4d}$, the word sequence $H_6$ is delayed 5d (FIG. 1F) to obtain a word sequence $H_{6\text{-}5d}$, and the word sequence $H_7$ is delayed 6d words (FIG. 1G) to obtain a word sequence $H_{7\text{-}6d}$, respectively. The word sequence $H_1$ is not delayed. As a result, seven word sequences $H_1$, $H_{2\text{-}d}$, $H_{3\text{-}2d}$, $H_{4\text{-}3d}$, $H_{5\text{-}4d}$, $H_{6\text{-}5d}$ and $H_{7\text{-}6fd}$ are time synchronized with each other. The synchronized seven words in each column are seriated during the single word time that they are available to obtain a serial data stream $S_1$ shown in FIG. 1H. In serial data stream $S_1$, the minimum time interval between words $H_1$, $H_2$, $H_3$, $H_4$, $H_5$, $H_6$ and $H_7$ which were originally adjacent to each other in the same column of the original block is 7d words. For example, the word $A_{1\text{-}6d}$ and the word $A_{2\text{-}6d}$ are spaced from each other by 7d words. Any burst or dropout error imposed on the time-interleaved block which extends over a time interval of less than 7d words in the time-interleaved block can produce an error in only one word in any one original column. Thus after reproduction and de-interleaving, error correction is possible using the parity word. Since it is necessary to detect whether or not an error exists in the time-interleaved serial data stream $S_1$, an error-detecting code, for example, a CRC code, is added in the data stream $S_1$ at every integral multiple of the seven words which make up a time-interleaved block.

Figure 2:
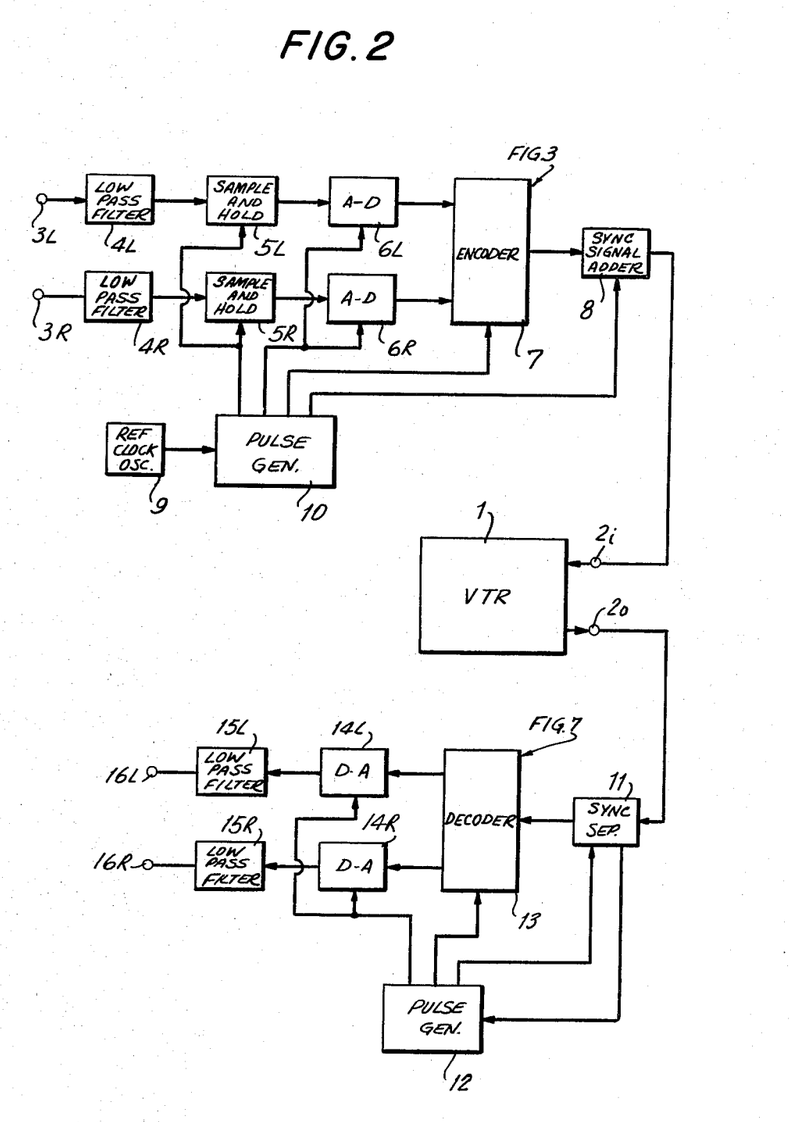
FIG. 2 is a block diagram of an error correcting system according to one embodiment of the present invention.

A PCM signal recording and reproducing system using a VTR according to the present invention is shown in FIG. 2. A helical-scan type VTR receives a PCM signal at its video input terminal $2_i$. The PCM signal contains normal television horizontal and vertical synchronizing signals. The PCM signal is recorded on a magnetic tape in a conventional manner by a recording system in VTR 1. A reproduced output of the magnetic tape is provided at video output terminal $2_o$ by a conventional reproducing system in the VTR 1.

Right-channel and left-channel signals of a stereo audio signal are respectively supplied through input terminals 3R and 3L and low pass filters 4R and 4L to sample and hold circuits 5R and 5L where they are sampled. These sampled outputs from sample and hold circuits 5R and 5L are fed to A-D converters 6R and 6L where they are converted into digital words which are supplied in parallel to an encoder 7 which will be described later. A parity word and CRC word are added to the parallel words and the resulting signal is time-compressed in an encoder 7 before being fed as a serial code to a synchronizing signal adding circuit 8. An output of synchronizing signal adding circuit 8 is supplied to video input terminal $2_i$ of VTR 1. A reference clock signal from a reference clock oscillator 9 is fed to a pulse generating circuit 10 to produce control signals such as a sampling pulse, an A-D converting clock pulse, a composite synchronizing signal, and a control signal to the encoder 7.

The PCM signal reproduced by VTR 1 is supplied through video output terminal $2_o$ to a synchronizing signal separating circuit 11. The composite synchronizing signal separated by synchronizing signal separating circuit 11 is applied to a pulse generating circuit 12. The PCM signal from synchronizing signal separating circuit 11 is applied to a decoder 13, to be described in detail later, which performs time base expansion, error detection and error correction on the PCM signal and supplies the resulting parallel words to D-A converters 14R and 14L. Analog outputs from D-A converters 14R and 14L are fed through low pass filters 15R and 15L to output terminals 16R and 16L, respectively. A control signal for decoder 13, clock pulses for D-A converters 14R and 14L, a timing pulse for synchronizing signal separating circuit 11 and the like are produced by pulse generating circuit 12. The time base used in reproduction is derived from the reproduced composite synchronizing signal.

Figure 3:
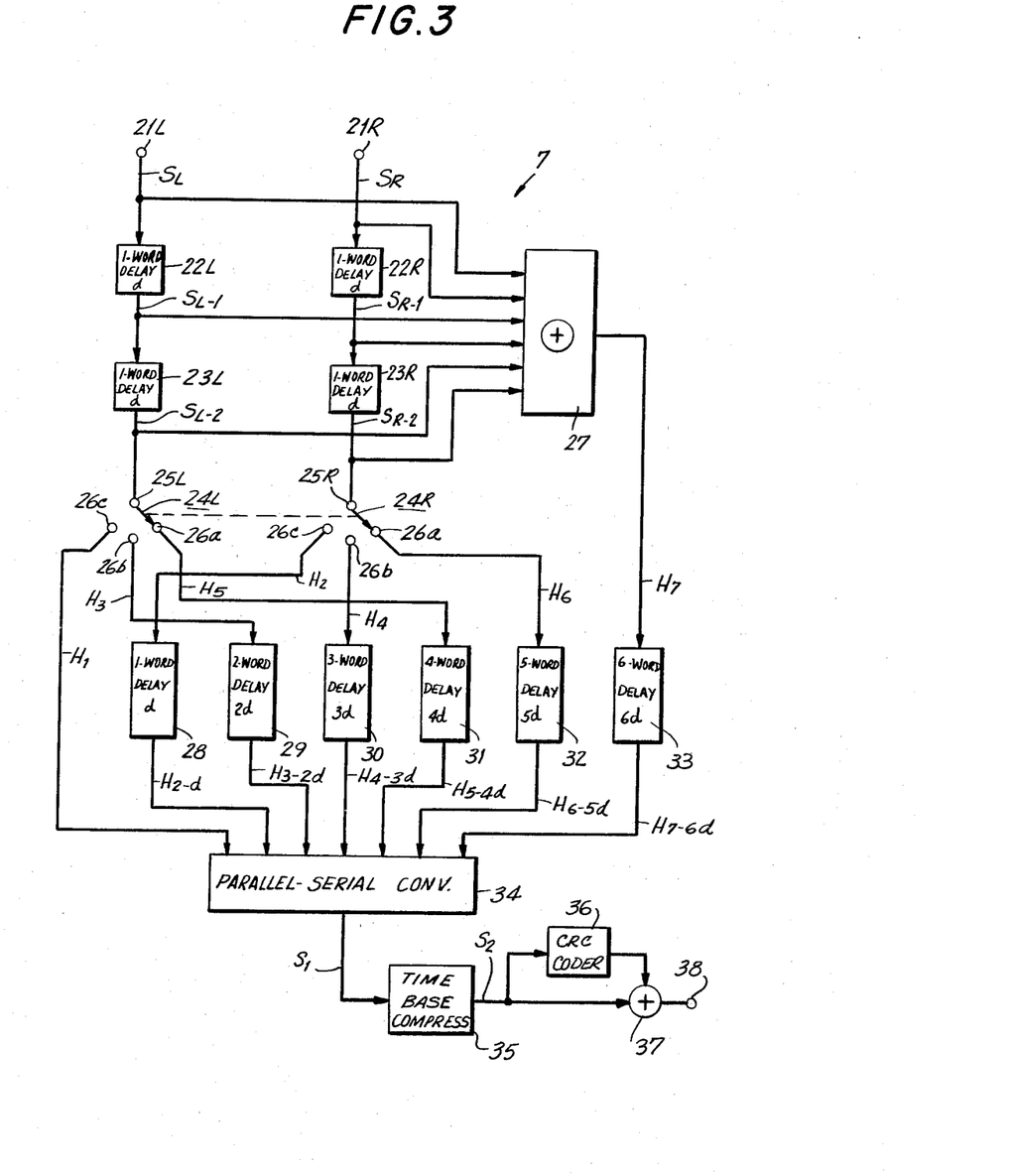
FIG. 3 is a block diagram of an encoder suitable for use with the error correcting system of FIG. 2.

An embodiment of encoder 7 is shown in FIG. 3. A PCM signal $S_R$ for a right audio channel and a PCM signal $S_L$ for a left audio channel are respectively supplied from A-D converters 6R and 6L (FIG. 2) through terminals 21R and 21L to one-word delay circuits 22R and 22L. Outputs $S_{R-1}$ and $S_{L-1}$, of one-word delay circuits 22R and 22L, respectively, are applied through other one-word delay circuits 23R and 23L to input ends 25L and 25R of switch circuits 24R and 24L to produce two-word delayed signals $S_{R-2}$ and $S_{L-2}$. Switch circuits 24R and 24L are ganged, and output ends 26Ra or 26La, 26Rb or 26Lb and 26Rc or 26Lc, of each switch circuit sequentially commutate between their input ends 25L or 25R at every word time. Six words, including the two undelayed words of the PCM signals $S_R$ and $S_L$, the two words $S_{R-1}$ and $S_{L-1}$ which are one word delayed in one word delays 22L and 22R, and the two words $S_{R-2}$ and $S_{L-2}$ which are additionally one-word delayed in one-word delays 23L and 23R are added in a modulo 2 summation circuit 27. Summation circuit 27 performs one operation or calculation every three pairs of words of the PCM signals $S_R$ and $S_L$, thus adding six words to produce a parity word $H_7$ having the same number of bits as each of the data words.

The word $H_1$ appearing at the output end 26c of switch circuit 24L is supplied without further delay to a parallel-serial converter 34, and the words $H_3$ and $H_5$ appearing at the other output ends 26b and 26a of switch circuit 24L are delayed 2d and 4d respectively in delay circuits 29 and 31 before being applied to parallel-serial converter 34. Similarly, the words $H_2$, $H_4$ and $H_6$ appearing at the output ends 26c, 26b and 26a of switch circuit 24R are respectively delayed 1d, 3d and 5d in delay circuits 28, 30 and 32 before being applied to parallel-serial converter 34. In addition, the parity word from modulo 2 summation circuit 27 is delayed 6d in a delay circuit 33 before being applied to parallel-serial circuit 34. The words $H_1$, $H_{2-d}$, $H_{3-2d}$, $H_{4-3d}$, $H_{5-4d}$, $H_{6-5d}$ and $H_{7-6d}$ from the delay circuits 28 to 33 are converted in parallel-serial converter 34 into a serial data stream or sequence $S_1$ (FIG. 6A) The time base of serial sequence $S_1$ is compressed in a time base compressing circuit 35. Time base compressing circuit 35 forms data lacking periods, shown by solid and dashed hatching in FIG. 6B, corresponding to the horizontal blanking period, the vertical blanking period, and an interval in which the CRC code may be inserted. A serial sequence $S_2$ from time base compressing circuit 35 including the data lacking periods is supplied directly to and through a CRC code generating circuit 36 to an adder 37 to obtain a serial sequence including the CRC code at an output terminal 38.

Figure 4A:
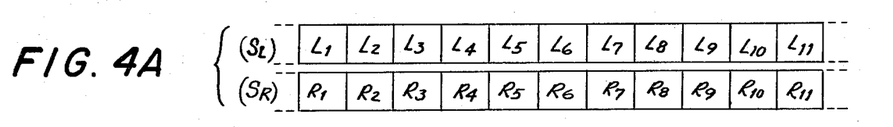
FIGS. 4A–4E are graphs showing the relationship of data words and error-correcting code words to which reference will be made in describing the operation of the encoder of FIG. 3 employed to encode audio data.
Figure 4B:
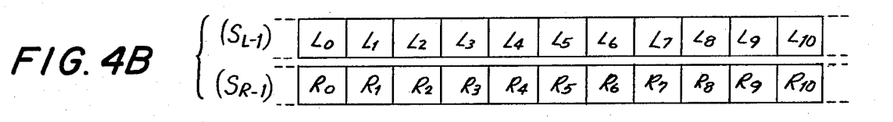
Figure 4C:
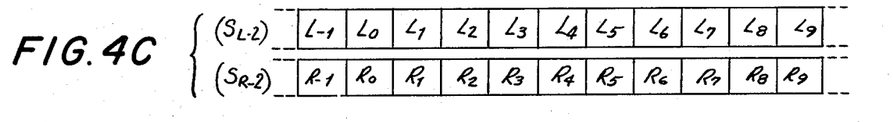
Figure 4D:
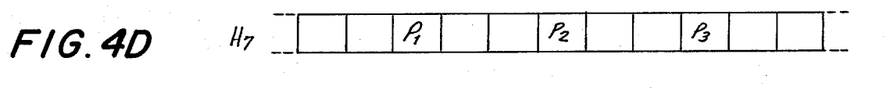

The operation of encoder 7 is further described with reference to FIGS. 4A–4E, FIG. 5 and FIGS. 6A–6C. FIG. 4A shows a sequence of the PCM words $S_R$ and $S_L$ respectively supplied from input terminals 21R and 21L. FIG. 4B shows the PCM signals $S_{R-1}$ and $S_{L-1}$ which are delayed 1d in 1d delay circuits 22R and 22L respectively. FIG. 4C shows the PCM signals $S_{R-2}$ and $S_{L-2}$ which are additionally delayed by 1d in 1d delay circuits 23R and 23L. Modulo 2 summation circuit 27 performs bit by bit modulo 2 summation on the six PC words, $S_R$, $S_L$, $S_{R-1}$, $S_{L-1}$, $S_{R-2}$ and $S_{L-2}$, to obtain the parity word $H_7$ (FIG. 4D). The parity word thus formed is such that $L_1 \oplus R_1 \oplus L_2 \oplus R_2 \oplus L_3 \oplus R_3 = P_1$. As mentioned previously, six words $H_1$ through $H_6$ originally simultaneously present in pairs as shown in FIG. 4E are obtained at six output ends of the switch circuits 24R and 24L.

Figure 4E:
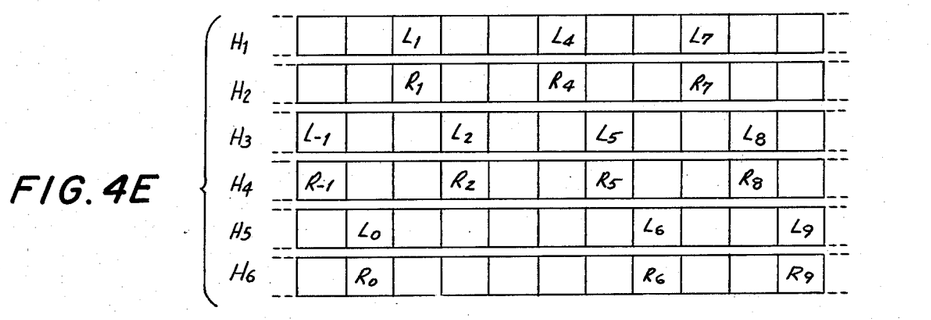
Figure 5A:
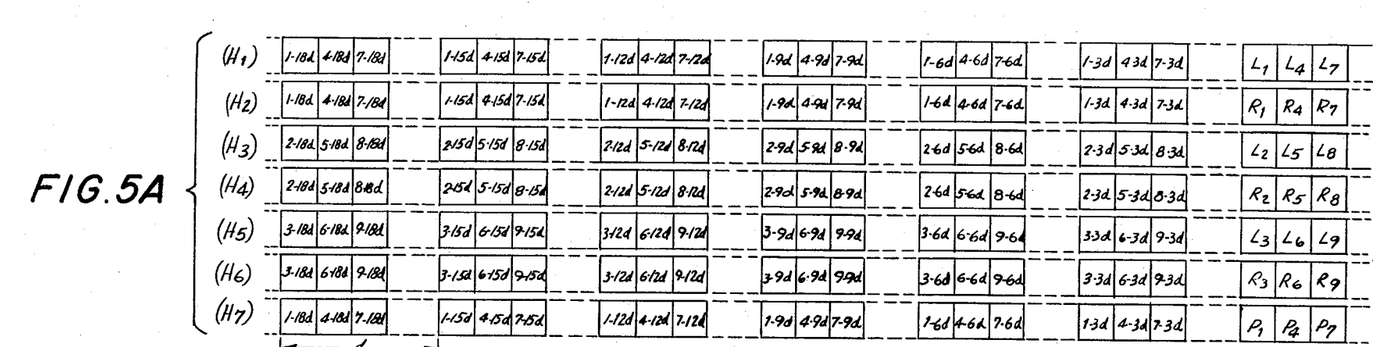
FIGS. 5A–5G are graphs showing the time relationship of signals to which reference will be made in describing de-interleaving of time-interleaved blocks.
Figure 5B:
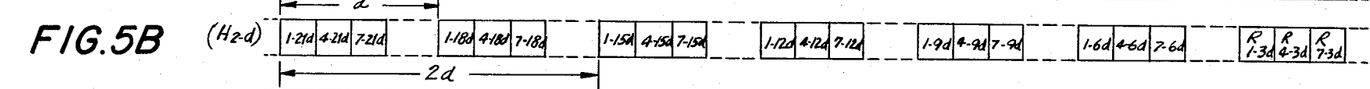
Figure 5C:
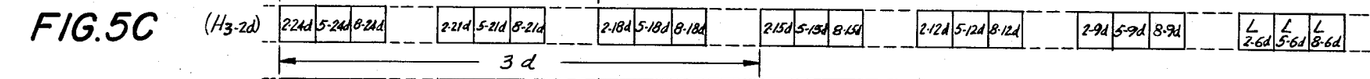
Figure 5D:
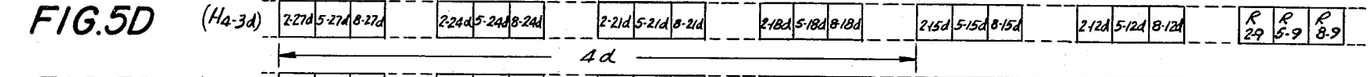
Figure 5E:
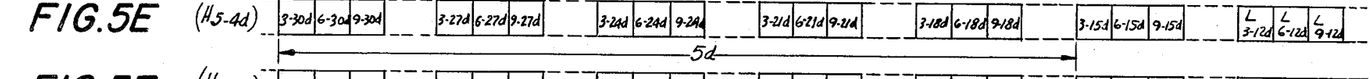
Figure 5F:
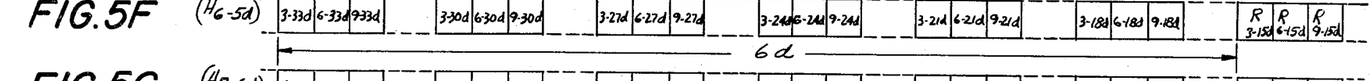
Figure 5G:
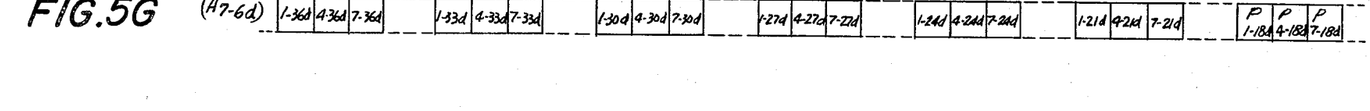
Figure 6A:
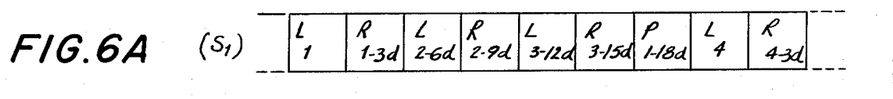
FIG. 6A is a graph of a time-interleaved block of digital data produced by the encoder of FIG. 3.
Figure 6B:
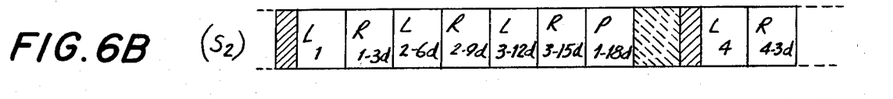
FIG. 6B is a graph of the time-interleaved block of digital data of FIG. 6A which has been time base compressed by the encoder of FIG. 3 to permit insertion of an error-detecting code and synchronizing signals.

Words $H_2$ through $H_7$ are respectively delayed by the delay circuits 28 to 33 to obtain the delayed words $H_{2-d}$ to $H_{7-6d}$ (FIG. 4E). In parallel-serial converter 34, words $H_1$ and $H_{2-d}$ to $H_{7-6d}$ form a new time interlaced block of seven rows by plural columns. From the time-interlaced block provided at the input of parallel serial-converter 34 there are derived seven words contained in the same column such as words $L_1$, $R_{1-3d}$, $L_{2-6d}$, $R_{2-9d}$, $L_{3-12d}$, $R_{3-15d}$, and $P_{1-18d}$ to form serial data stream $S_1$ (FIG. 6A).

Figure 6C:
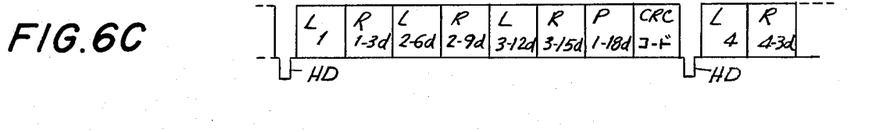
FIG. 6C is a graph of a time-interleaved, time base compressed block to which an error detecting code (CRC) and synchronizing signals have been added.

The time base compressing circuit 35 compresses the time base of serial data $S_1$ (FIG. 6A) to form serial data $S_2$ (FIG. 6B) having data lacking periods corresponding to a horizontal blanking period shown by solid hatched lines, a period required for adding the CRC code shown by dashed hatched lines, and a period corresponding to the vertical blanking period (not shown). The CRC code, which is formed in relationship to the time interleaved block, is added to the seven words appearing in one horizontal period. The number of bits in the CRC code is the same as the number of bits in the words in the time interleaved block. FIG. 6C shows a format of a complete signal ready for recording including the CRC code and horizontal synchronizing signal HD and the like. This signal is fed a bit at a time to video input terminal $2_i$ (FIG. 2) of VTR 1.

Figure 7:
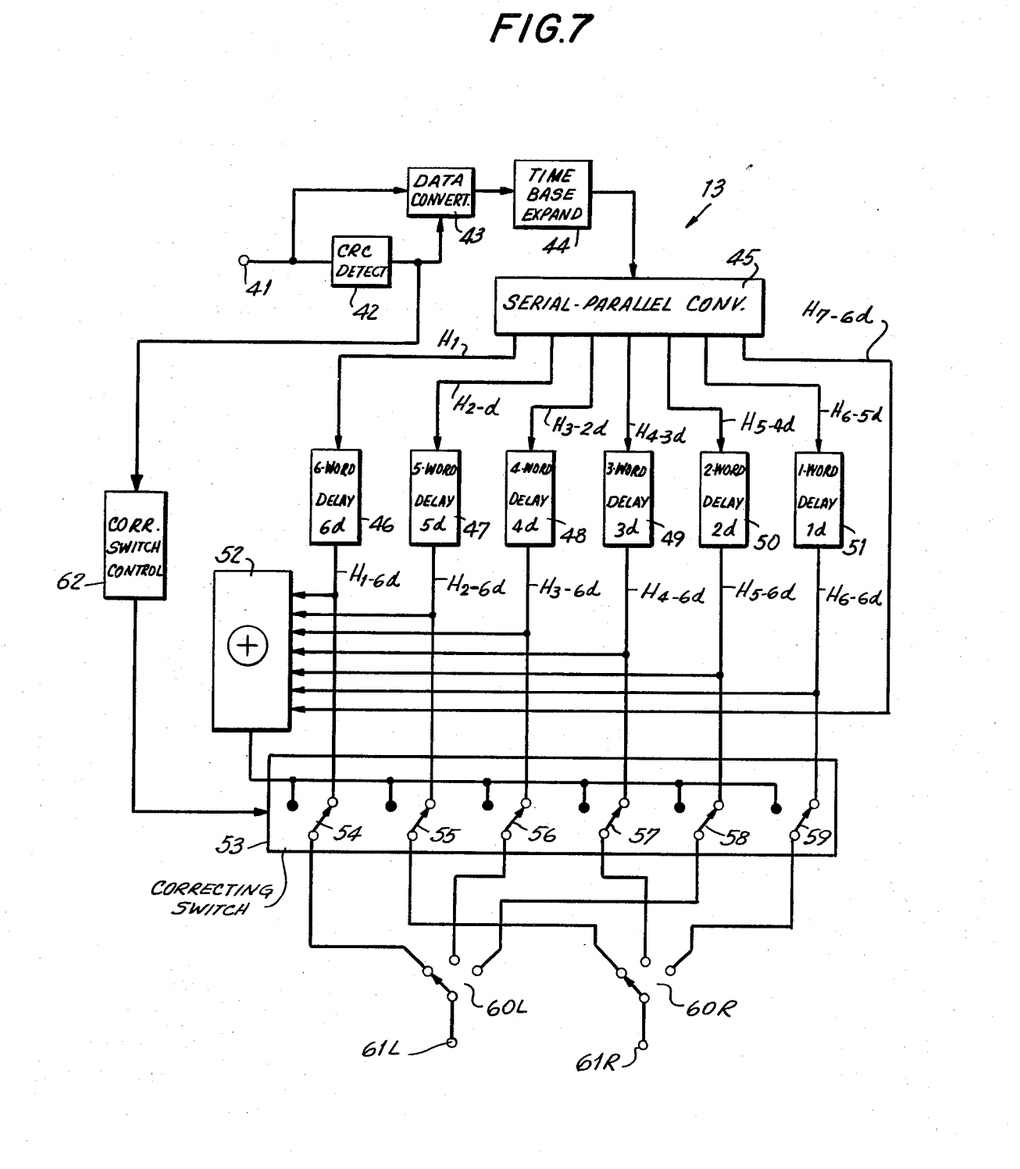
FIG. 7 is a block diagram of a decoder suitable for use with the error correcting system of FIG. 2.

Referring now to a detailed block diagram of decoder 13 shown in FIG. 7, reproduced serial data from which the synchronizing signal has been removed is applied through an input terminal 41 to a CRC detecting circuit 42 and a data converting circuit 43. If no error is detected, the data from data converting circuit 43 is fed to a time base expanding circuit 44 to produce serial data without a data-lacking period. The time-expanded serial data from time base expanding circuit 44 is applied to a serial-parallel converter 45 where it is separated into seven parallel-transmitted words $H_1$, $H_{2-d}$, ..., $H_{7-6d}$.

Words $H_1$ to $H_{6-5d}$ from the serial-parallel converter 45 are respectively applied to delay circuits 46 to 51 which apply delay of 6d-1d respectively. Thus the total delays to which all words have been subjected including delays during time interleaving in encoder 7 (FIG. 3) and during time de-interleaving in decoder 13 become equal. Accordingly, words $H_{1-6d}$ through $H_{6-6d}$ obtained at the respective outputs of the delay circuits 46 through 51 and word $H_{7-6d}$ are returned to the relationship shown in FIGS. 4D and 4E and $H_1$ through $H_7$ of FIG. 5. These de-interleaved words are supplied to a modulo 2 summation circuit 52 and to terminals of switches 54 to 59 in a correcting switch circuit 53. The outputs of modulo 2 summation circuit are fed to other terminals of switches 54 to 59 in correcting switch circuit 53. One input (shown by a white circle) of each switch is connected to an output of one of delay circuits 46 to 51, and the other input (shown by a black circle) thereof is connected to an output of summation circuit 52.

CRC detecting circuit 42 detects whether an error exists in the six data words within the horizontal period being processed. A detected CRC error produces a control signal which is fed to control data converting circuit 43. When an error is detected by CRC detecting circuit 42 in the six data words that are contained in a time-interleaved block, all bits in the six data words in the time-interleaved block are set to zero by data converting circuit 43. The detecting output of CRC detecting circuit 42 is also applied to a correcting switch control circuit 62 and an output therefrom is applied to correcting switch circuit 53 to selectively control the respective switches 54-59. Words in which no error is detected in CRC detecting circuit 42 are delivered from the input ends (white circle) of switches 54 to 59 to output ends thereof. When an error is detected by CRC detecting circuit, the word with the error in the de-interleaved block is replaced by the error corrected word at the output of summation circuit 52 by changing the appropriate one of switches 54 to 59 from its white circled input to its black circled input.

If a burst error or a signal dropout during recording or reproduction endures for a period of no more than 7d words, all within a single time-interleaved block, the error appears in only one word or less in a column of any one de-interleaved block. When only a single error appears in a column of a block, the error can be corrected according to this invention using the parity word produced for that block before interleaving. For example, when only word $R_1$ of the seven words $L_1$, $R_1$, $L_2$, $R_2$, $L_3$ and $P_1$ in the same column contains an error, all bits in word $R_1$ are set to "0" by data converting circuit 43. Modulo 2 summation of $L_1 \oplus O \oplus L_2 \oplus R_2 \oplus L_3 \oplus R_3 \oplus P_1 = R_1$ is performed in summation circuit 52 to produce the correct value of $R_1$. As a result, the output of summation circuit 52 which consists of the corrected word $R_1$, is applied through switch 55 of correcting switch circuit 53 under control of correcting switch control circuit 62.

The error-corrected PCM signal is supplied to input ends of switch circuits 60R and 60L. Switch circuit 60R commutates between its inputs to provide the PCM signal relating to the right channel sequentially through switches 55, 57 and 59 to an output terminal 61R. Similarly, switch circuit 60L commutates between its inputs to provide the PCM signal relating to the left channel sequentially through switches 54, 56 and 58 to an output terminal 61L.

It would be clear to one skilled in the art in the light of the present disclosure that the result of CRC detection may be added to each word of the PCM signal as a detection bit and that this detection bit may be used to control error correction. Further, if two or more words in the same column contain errors, it is impossible to correct the errors by using a parity word. In this case, the words containing errors may be interpolated using the mean value of the nearest correct words located before and after the words containing the errors. Instead of using a mean value, the last correct value may be held until a correct word is received. Alternatively, the word containing the error may be muted or suppressed. In addition, it is optional that any of the original words $H_1$ through $H_7$ be delayed by a particular amount such as 0 words, 1d word, ..., 6d words. The present invention is not limited to a parity word for error correction. Any other error correction code may be used. Furthermore, the present invention is not limited to an error-detecting code employing a CRC code. Any other error detecting code may also be used without departing from the spirit of the present invention.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of processing sequentially transferred digital information words, said method comprising the steps of: forming a block of a plurality of said information words; forming and adding an error-correcting word to said block, said error correcting word being capable of reproducing any one of said information words in said block; time-interleaving each of said information words and said error correcting word in said block into time-interleaved blocks distributed over a predetermined time; adding an error-detecting code to at least one of said time-interleaving blocks; and transmitting said at least one time-interleaved block and said error-detecting code associated therewith.

2. A method according to claim 1; wherein said error-detecting code is a cyclic redundancy check code which is effective to detect occurrence of errors in an information word in said time-interleaved block.

3. A method according to claim 1; further comprising the steps of: receiving said time-interleaved block having said information words, said error-correcting word, and said error-detecting code; detecting an occurrence of errors in received words including said time-interleaved block using said error-detecting code; de-interleaving each word in said time-interleaved block including information words and said error-correcting word; erasing all the bits in each of said received words in a time-interleaved block in which an error is detected; reproducing a reproduced word in said de-interleaved block using said error correcting word corresponding to an information word in said time-interleaved block which contained an error; and outputting said reproduced word instead of a corresponding received information word when said error is detected.

4. Apparatus for processing digital information words comprising: means for distributing a predetermined number of said digital information words into a block; means for forming and adding an error-correcting word to said block; interleaving means for time-interleaving each information word in said block and said error-correcting word into time-interleaved blocks distributed over a predetermined time; means for adding an error-detecting code to each of said time-interleaved blocks; and means for transmitting said time-interleaved blocks and said error-detecting code.

5. Apparatus according to claim 4; further comprising: means for receiving said time-interleaved block and said error detecting code; detecting means for detecting an error in at least one of said information words in said time-interleaved block; de-interleaving means for reconstructing said block; said interleaving means being effective to place no more than one information word from said block into one time-interleaved block whereby said block after de-interleaving contains only one of said information words from any one of said time-interleaved blocks; and means responsive to said detecting means for producing a correct information word to replace said one information word in said block after de-interleaving which corresponded to the one information word from said time-interleaved block in which an error was detected.

6. A method of processing a plurality of sequential digital information words, comprising the steps of: forming a block of a first predetermined number of said digital words; producing an error correcting word for said block; appending said error correcting word to said block; time-interleaving each word of said block and said error correcting word into separate time-interleaved blocks; producing an error detecting word for each of said time-interleaved blocks; appending each error detecting word to its respective time-interleaved block; testing at least one of said time-interleaved blocks for errors using its error detecting word and producing an error signal; de-interleaving said time-interleaved blocks so that said blocks are reconstructed with only one information word from any one of said time-interleaved blocks being located in each said reconstructed block; and correcting said only one information word using said error correcting word under control of said error signal.

* * * * *